Patented July 4, 1939

2,165,030

UNITED STATES PATENT OFFICE 2,165,030

PEST CONTROL COMPOSITION

Euclid W. Bousquet, Wilmington, Del., assignor to E. I. du Pont de Nemours & Company, Wilmington, Del., a corporation of Delaware No Drawing. Application May 20, 1937, Serial No. 143,730

13 Claims. (Cl. 167—34)

This invention relates to sulfurized nicotines and to compositions containing them, which compositions are useful for controlling or destroying lower forms of life.

It is known that sulfurized nicotines may be produced by reacting nicotine with sulfur at a temperature above that at which hydrogen sulfide is evolved. Thus Cahours and Etard, Bulletin Societe Chimique, vol. 34, page 449 (1880), have obtained a compound of the formula $C_{20}H_{18}N_4S$ by fusing sulfur and nicotine at 140° C. Morton and Horwitz, Journal of the American Chemical Society, vol. 57, pages 1860–1 (1935), report having obtained this same compound, which they term thiodinicotyrine, by prolonged heating of sulfur and nicotine in boiling toluene. The structure of these products and the reactions which take place in their formation are not definitely known, but evolution of hydrogen sulfide in excess of that incident to simple thionation, and the presence of small amounts of nicotyrine (dehydrogenated nicotine) in the reaction mass, indicate that the nicotine residue to which the sulfur is bound has, at least in part, the nicotyrine structure.

I have now discovered that, if sulfur and nicotine are reacted together at the proper temperature in the presence of a catalyst such as iodine, a sulfurized nicotine is produced containing twice the amount of sulfur indicated by Cahours and Etard. Although the physical properties of this material are similar in many respects to those reported by Cahours and Etard on the one hand and Morton and Horwitz on the other, my analysis shows conclusively that the nicotine and the sulfur have combined in the proportion of one atom of sulfur for each mol of nicotine in contradistinction to the ratio of one to two previously reported.

In order to distinguish my sulfurized nicotine from that of Cahours and Etard, I shall refer to it as "equimolar-sulfurized nicotine" to indicate that it contains sulfur in the ratio of one atom of sulfur to each mol of nicotine residue.

Although nicotine itself has long been recognized for its ability to destroy the lower forms of plant and animal life it possesses certain undesirable properties which have, in a large measure, restricted its use. Its high water solubility together with its fugitive or volatile nature are inconsistent with the permanency of application required of stomach poisons for leaf-eating insects, and its disagreeable odor is not only inconsistent with many applications such as the moth-proofing of fabrics, but also otherwise generally undesirable.

I have found further that sulfurized nicotines, particularly my equimolar-sulfurized nicotine, possess the property of repelling, of being toxic to, or of being capable of killing lower forms of life, and at the same time lack or possess to a lesser degree many of the disadvantageous properties of nicotine itself. Because of these properties, I have found sulfurized nicotines particularly useful as pest-controls.

By the term "pest" I refer to economically or physiologically harmful lower forms of life in the same sense that the term is used in the United States patent to Hartmann 1,908,341, July 31, 1934. Thus I consider as "pests" not only economically or physiologically harmful microorganisms such as mold, fungi, bacteria, and protozoa, but also economically or physiologically harmful invertebrates popularly known as "insects", "worms", or "bugs" such as flies, spiders, moths, snails, fleas, worms, caterpillars, and mosquitoes. By the term "pest-control" I refer to substances which are useful in controlling or combating such economically harmful lower forms of life as come within the scope of the term "pest", whether this control be brought about thru a repellent action only, or by an actual toxic effect from external contact or thru absorption into the alimentary tract (stomach poison), or by a paralytic effect, or by any combination of these several effects. The term "pest-control" as used herein is considered a generic expression including such terms as germicide, fungicide, insecticide, vermicide, antiseptic, mothicide, aphicide, bactericide and the like.

As compared with nicotine, sulfurized nicotines possess advantages which substantially enlarge their range of pest-control application. Their insolubility in water and their non-volatile nature make them particularly suited for use as stomach poisons for leaf-eating pests, where permanency of application is an important factor. Their odorless character, besides making them more pleasant to handle, makes them suitable for uses such as the moth-proofing of fabrics, fly sprays and the like.

The products of this invention possess still other economic advantages over nicotine. For example, my equimolar-sulfurized nicotine is a dry crystalline powder which is more convenient to handle. Sulfurized nicotines in general contain a high percentage of sulfur which makes them less expensive. My novel composition, equimolar-sulfurized nicotine, is particularly advantageous in this latter respect.

While the sulfurized nicotines suitable for use in the present invention include those of Cahours and Etard and of Morton and Horwitz, already referred to, as well as sulfurized nicotine made with such catalysts as alkali metal, iron, zinc and aluminum halides, I prefer to employ in this invention my equimolar-sulfurized nicotine which is made by reacting sulfur and nicotine in the presence of a halogen, such as iodine.

One detailed procedure which I have employed succesfully in making equimolar-sulfurized nicotine is given in the following example:

Example I

A mixture of 114 parts by weight of nicotine, 45 parts by weight of sulfur and 1 part by weight of iodine was heated with stirring to between 110° C. and 120° C. Evolution of hydrogen sulfide commenced as soon as the temperature reached 110° C. and continued for about 5 hours. The reaction mass was then cooled and washed with water to remove water-soluble impurities. One hundred fifteen parts of a brown, viscous oil was obtained. This oil was added to 176 parts by weight of cold benzene, and the copious precipitate which formed was filtered and washed successively with benzene and ether. There were thus obtained 40 parts by weight of a dry yellow crystalline powder melting at 149°–151° C. On being recrystallized from 95% ethyl alcohol, it melted constantly at 153°–154° C.

The following table gives my elementary analysis of the sulfurized nicotine obtained by the procedure described in the above example and compares the same with the percentages of the several elements that would be present in a sulfurized nicotine, having the formula ascribed by Cahours and Etard, viz., $C_{20}H_{18}N_4S$.

Table

|  | Percent carbon | Percent hydrogen | Percent nitrogen | Percent sulfur |
|---|---|---|---|---|
| Product of Ex. I | 63.96 | 4.65 | 14.11 | 17.08 |
| Calc. for $C_{20}H_{18}N_4S_2$ | 63.44 | 4.79 | 14.81 | 16.94 |
| Product of formula $C_{20}H_{18}N_4S$ (calc.) | 69.25 | 5.23 | 16.17 | 9.26 |

These data show clearly that the product of the above example contains equimolar proportions of sulfur and nicotine residue, that its composition is entirely different from that reported by Cahours et al. and Morton et al., and that the nicotine residue probably has the nicotyrine structure.

My product may be considered as having one of the formulas $C_{20}H_{18}N_4S_2$ and $C_{10}H_8N_2S$, or, less probably, as a mixture of compounds of these formulas. Its internal molecular structure is not definitely known at this time, but I believe it to be one of the following configurations, depending upon which mass formula is correct:

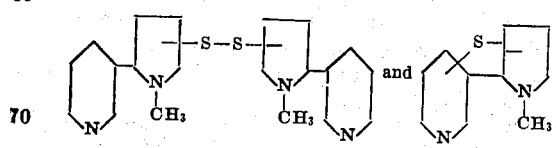

Less likely configurations are those in which the sulfur attachment is between two pyridine rings or between a pyrrole and a pyridine ring.

Although I have disclosed specific amounts of sulfur and nicotine in the above example, it is possible to vary considerably the proportions of these substances. Thus I may effect the reaction with an excess of either nicotine or sulfur. As a general rule, a molecular excess of sulfur is preferred since, in addition to the amount required for the thionation, a considerable further quantity is used up, apparently for dehydrogenating the nicotine. Of the sulfur entering into the thionation reaction one-half or one-third, depending upon which mass formula is correct, is converted into and passes off as hydrogen sulfide, whereas of that entering into the dehydrogenation reaction all is converted into hydrogen sulfide.

I have disclosed specifically iodine as a catalyst for preparing my equimolar-sulfurized nicotine, but other halogens such as chlorine and bromine may be used—tho with a lesser degree of success. By effecting the reaction in the presence of a halogen catalyst the equimolar-sulfurized nicotine is produced instead of the thiodinicotyrine. I attribute this result to the presence of the catalyst which greatly intensified the reaction. The effect of the catalyst is very marked, the reaction proceeding at a much lower temperature and in but a fraction of the time required for initiating and completing reaction between sulfur and nicotine in the absence of the catalyst.

Temperatures that may be used in the process range from 110° C. to 225° C., but are preferably from 110° C. to 130° C. Details of purification of the product also may vary from those given in Example I. For example, various liquid precipitating media such as aromatic hydrocarbons, viz., benzene, toluene, and alcohols such as methyl or ethyl may be used, or the precipitations may be effected merely by allowing the mass to stand, with or without external cooling.

Sulfurized nicotines are particularly useful in combating and controlling the economically and physiologically harmful forms of life. For this purpose they may be used alone or in combination with other known pest-controls, either as dusts or sprays, and may include wetting, dispersing and sticking agents such as sulfonated alcohols, hydrocarbon oils, animal and vegetable oils, rosin, flour, talc, starch, and the like. They may also be applied with good results from the standpoint of adhesion, from dispersions in dilute aqueous acid solutions of deacetylated chitin and other acid-soluble amino-nitrogen-containing polymeric bodies.

In order more fully to illustrate my invention, the following data on the pest-control activity of sulfurized nicotine, with respect to certain of the more economically harmful pests, are given:

Example II

Equimolar-sulfurized nicotine was diluted with talc to a concentration of 10% and dusted on plants which were later infested with Colorado beetle (larvae) and Mexican bean beetle (adult), with the following results:

| Insect | Percent killed | Percent killed lead arsenate control (dust) |
|---|---|---|
| Colorado potato beetle (larvae) | 60 | 80 |
| Mexican bean beetle (adult) | 100 | 90 |

These data show that sulfurized nicotine applied as a dust compares favorably with lead arsenate, which is well known to be an exceptionally effective stomach poison.

Example III

Equimolar-sulfurized nicotine containing 0.5 per cent sodium salt of mixed sulfated higher alcohols containing from 8 to 16 carbon atoms was emulsified to form sprays of 0.5 per cent and 1.0 per cent concentrations. These compositions were then sprayed upon plants which were later infected with Mexican bean and Japanese beetles (adults), respectively, with the following results:

| Insect | Percent killed | Per cent killed lead arsenate control (spray) |
|---|---|---|
| Mexican bean beetle (adult) | 20 | 10 |
| Japanese beetle (adult) | 34 | 46 |

These data show that sulfurized nicotines may be employed as sprays with results comparable to those obtained with lead arsenate sprays of the same concentration.

Example IV

A saturated kerosene solution of equimolar-sulfurized nicotine was sprayed upon flies with the following results:

| Insect | Percent killed | Percent killed pyrethrum control (0.125%) |
|---|---|---|
| Flies | 35.8 | 56.6 |

The relatively low percentage of flies killed in this experiment may be attributed to the limited solubility of the sulfurized nicotine in kerosene. Notwithstanding this fact, the results compare sufficiently favorably with the standard pyrethrum spray to show that the sulfurized nicotines may be used effectively as contact poisons.

Instead of the purified equimolar-sulfurized nicotine I may use the crude reaction mass or the water-insoluble portion of the reaction mass without purification which probably contains, in addition to sulfurized nicotine, other derivatives of nicotine which act partly as diluents and partly as additional pest-controls. It may be observed that the dehyrogenated or partially dehydrogenated nicotines which are probably present are in themselves effective pest-controls. Instead of my crude or purified equimolar-sulfurized nicotine, I may also use a sulfurized nicotine prepared with large amounts of sulfur. This may impair the insecticidal activity to some extent, but it provides a cheaper product.

The sulfurized nicotines may also be used in the form of their salts such as sulfates, chlorides, thiocyanates, and tannates.

While I have specifically described my invention in its preferred aspects it is to be understood that various changes and modifications may be made without departing from the invention or sacrificing the advantages thereof.

I claim:

1. A pest-control composition comprising as an essential active ingredient a sulfurized nicotine.

2. A pest-control composition comprising as an essential active ingredient a reaction product of sulfur and nicotine.

3. A pest-control composition comprising as an essential active ingredient a product obtained by reacting sulfur and nicotine in the presence of a halogen catalyst.

4. A pest-control composition comprising as an essential active ingredient a sulfurized nicotine having a sulfur content of about 17 per cent and in which the sulfur and nicotine have combined in substantially equimolar proportions.

5. Method of making sulfurized nicotine which comprises reacting sulfur with nicotine in the presence of a halogen catalyst.

6. Method according to claim 5 in which the catalyst is iodine.

7. Method according to claim 5 in which the catalyst is iodine and the reaction temperature is from 110° C. to 225° C.

8. Sulfurized nicotine having a sulfur content of about 17 per cent.

9. Sulfurized nicotine corresponding substantially to the formula $C_{20}H_{18}N_4S_2$.

10. Sulfurized nicotine in which the sulfur and nicotine have combined in substantially equimolar proportions.

11. Sulfurized nicotine obtainable by the method of claim 5.

12. The method of treating plants to control destructive invasion of plant pests which comprises applying to the plant a composition containing as an essential active ingredient sulfurized nicotine.

13. The method of treating plants to control destructive invasion of plant pests which comprises dusting the plants with a dusting composition containing as an essential active ingredient sulfurized nicotine.

EUCLID W. BOUSQUET.